(12) United States Patent
Zahrt et al.

(10) Patent No.: US 12,590,719 B2
(45) Date of Patent: Mar. 31, 2026

(54) TEST CHAMBER AND METHOD FOR ITS CONTROL HAVING COOLING CIRCUIT ACCOMMODATING SMALL VOLUME TEST CHAMBER

(71) Applicant: Weiss Technik GmbH, Reiskirchen (DE)

(72) Inventors: Yannik Zahrt, Rabenau (DE); Dennis Reuschel, Giessen (DE); Christian Haack, Marburg (DE)

(73) Assignee: WEISS TECHNIK GMBH, Reiskirchen (DE)

( * ) Notice: Subject to any disclaimer, the term of this patent is extended or adjusted under 35 U.S.C. 154(b) by 153 days.

(21) Appl. No.: 18/228,095

(22) Filed: Jul. 31, 2023

(65) Prior Publication Data

US 2024/0044530 A1 Feb. 8, 2024

(30) Foreign Application Priority Data

Aug. 5, 2022 (EP) ..................................... 22188925

(51) Int. Cl.
F25B 1/10 (2006.01)
B01L 7/00 (2006.01)
(Continued)

(52) U.S. Cl.
CPC ................ F24F 5/001 (2013.01); B01L 7/00 (2013.01); F24F 11/86 (2018.01); F25B 1/10 (2013.01);
(Continued)

(58) Field of Classification Search
CPC ..................................................... G01N 17/002
See application file for complete search history.

(56) References Cited

U.S. PATENT DOCUMENTS

| | | | |
|---|---|---|---|
| 2009/0217679 A1* | 9/2009 | Raghavachari | F25B 49/02 62/77 |
| 2010/0132399 A1* | 6/2010 | Mitra | B60H 1/3228 62/512 |

(Continued)

FOREIGN PATENT DOCUMENTS

| | | |
|---|---|---|
| EP | 0344397 A2 | 12/1989 |
| EP | 1939548 A1 | 7/2008 |

*Primary Examiner* — Jerry-Daryl Fletcher
*Assistant Examiner* — Daniel C Comings
(74) *Attorney, Agent, or Firm* — Quarles & Brady LLP

(57) ABSTRACT

A method for conditioning air in a temperature-insulated test space of a test chamber and a test chamber serving for receiving test material, in which a temperature ranging from −20° C. to +180° C. is generated within the test space. A cooling circuit has an internal heat exchanger, which is connected on a high-pressure side of the cooling circuit downstream of a gas cooler and upstream of an expansion valve, the internal heat exchanger being coupled with a medium-pressure bypass of the cooling circuit, the medium-pressure bypass being connected downstream of the internal heat exchanger or the gas cooler and upstream of the expansion valve on the high-pressure side as well as upstream of a high-pressure compressor and downstream of a low-pressure compressor on a medium-pressure side of the cooling circuit, refrigerant being dosed in the medium-pressure side from the high-pressure side via the internal heat exchanger by a second expansion valve.

12 Claims, 1 Drawing Sheet

(51) Int. Cl.
| | |
|---|---|
| *F24F 5/00* | (2006.01) |
| *F24F 11/86* | (2018.01) |
| *F25B 9/00* | (2006.01) |
| *G01N 17/00* | (2006.01) |
| *B01L 1/02* | (2006.01) |

(52) U.S. Cl.
CPC ........... *F25B 9/008* (2013.01); *G01N 17/002* (2013.01); *B01L 1/025* (2013.01); *F25B 2400/0409* (2013.01); *F25B 2600/2513* (2013.01)

(56) References Cited

U.S. PATENT DOCUMENTS

| | | | |
|---|---|---|---|
| 2010/0223939 A1 | 9/2010 | Mitra et al. | |
| 2011/0315783 A1* | 12/2011 | Baker | ...................... B01L 1/025 |
| | | | 236/3 |
| 2015/0267954 A1* | 9/2015 | Ryu | ........................ F25B 49/02 |
| | | | 62/504 |
| 2019/0383713 A1* | 12/2019 | Haack | ........................ F25B 5/02 |
| 2020/0240686 A1* | 7/2020 | Yajima | ...................... F25B 1/00 |

* cited by examiner

TEST CHAMBER AND METHOD FOR ITS CONTROL HAVING COOLING CIRCUIT ACCOMMODATING SMALL VOLUME TEST CHAMBER

This patent application claims priority of the European Patent Application No. 22188925.6 filed on Aug. 5, 2022, the disclosure of which is incorporated herein by reference.

The invention relates to a test chamber, in particular a climate chamber, for conditioning air and to a method for conditioning air in a temperature-insulated test space of a test chamber, the test space being closable to an environment and serving for receiving test material, a temperature ranging from –20° C. to +180° C. being generated within the test space by means of a cooling device of a temperature control device of the test chamber and using a cooling circuit using carbon dioxide as a refrigerant, a heat exchanger in the test space, a low-pressure compressor and a high-pressure compressor, which is disposed downstream of the low-pressure compressor in a flow direction of the refrigerant, a gas cooler and an expansion valve, the temperature being controlled and/or regulated by means of a control device of the test chamber.

Test chambers of this kind are commonly used for observing physical and/or chemical properties of objects, in particular devices. Temperature test consoles or climate test consoles are thus known, within which temperatures ranging from –40° C. to +180° C. can be set. In climate test consoles, desired climate conditions can be additionally set, to which devices and/or the test material are exposed over a defined period of time. A temperature of the test space to receive the test material is regularly controlled in a circulating-air channel within the test space. The circulating-air channel forms an air-treatment space in the test space, heat exchangers for heating or cooling the air flowing via the circulating-air channel and/or the test space being disposed in the air-treatment space. In this context, a fan suctions the air present in the test space and conducts it in the circulating-air channel to the corresponding heat exchangers. The temperature of the test material can be controlled thus or even be subjected to a defined change in temperature. During a test interval, a temperature can change between a temperature maximum and a temperature minimum of the test chamber, for example. A test chamber of this kind is known from EP 0 344 397 A2, for example.

The refrigerant used in a cooling circuit should have a relatively low $CO_2$ equivalent, meaning a relative greenhouse potential or a global warming potential (GWP) should be as low as possible in order to avoid indirectly damaging the environment via the refrigerant upon its release. It is therefore also known to use carbon dioxide ($CO_2$) as a pure-substance refrigerant. Carbon dioxide is available at low cost, is noflammable and essentially environment neutral at a GWP of 1. Carbon dioxide has a freezing point and/or a triple point of –56.6° C., which does not enable attaining lower temperatures with only carbon dioxide.

Furthermore, cooling devices are known which are designed as booster installations. In a cooling circuit of the cooling devices, a high-pressure compressor is always switched in series downstream of a low-pressure compressor, meaning the refrigerant is compressed in steps using the low-pressure compressor followed by the high-pressure compressor. Owing to the high requirements to a temperature control device within the temperature range of the test space, fluctuations often occur regarding a load requirement during operation of the test chamber. A cooling capacity generated by the compressors and the expansion valve therefore must be able to be regulated continuously. Nevertheless, it is desirable that the compressors are not often switched on and off in order to prolong a service life of the compressor.

Since carbon dioxide as a refrigerant has a very high volumetric cooling capacity, a very large cooling capacity is provided by the cooling circuit even when using compressors having very little stroke volume flow. Moreover, a pressure range of cooling circuits using carbon dioxide as refrigerant is very high (up to 120 bar) during a transcritical operation, for which reason the components required for forming the cooling circuit are comparatively expensive. In addition, cooling circuits of this kind have a complex design, which requires a large construction space. Hitherto, cooling circuits of this kind using carbon dioxide as a refrigerant can only be used in a worthwhile manner for installations and/or test chambers having an accordingly high cooling capacity and thus a comparatively large test space and/or large device measurements. An economical use in installations small in comparison and/or test chambers having a small volume of a test space, for example 25 liters, has hitherto not been possible.

The object of the invention is therefore to propose a method for conditioning air in a test space of a test chamber and a test chamber, which both enable a comparatively compact and technically simple design of the test chamber.

This object is attained by a method as disclosed herein and a test chamber as disclosed herein.

In the method according to the invention for conditioning air in a temperature-insulated test space of a test chamber, in particular a climate chamber, serving for receiving test material, the test space being closable to an environment, a temperature ranging from –20° C. to +180° C. is generated within the test space by means of a cooling device of a temperature control device of the test chamber and using a cooling circuit using carbon dioxide as a refrigerant, a heat exchanger in the test space, a low-pressure compressor and a high-pressure compressor, which is disposed downstream of the low-pressure compressor in a flow direction of the refrigerant, a gas cooler and an expansion valve, the temperature in the test space being controlled and/or regulated by means of a control device of the test chamber, the cooling circuit having an internal heat exchanger, which is connected on a high-pressure side of the cooling circuit downstream of the gas cooler and upstream of the expansion valve, the internal heat exchanger being coupled with a medium-pressure bypass of the cooling circuit, the medium-pressure bypass being connected downstream of the internal heat exchanger or the gas cooler and upstream of the expansion valve on the high-pressure side as well as upstream of the high-pressure compressor and downstream of the low-pressure compressor on a medium-pressure side of the cooling circuit, refrigerant being dosed in the medium-pressure side from the high-pressure side via the internal heat exchanger by means of a second expansion valve.

In the method according to the invention, a heat exchange with an environment of the test space is mostly prevented via a temperature insulation of lateral walls, bottom walls and top walls. The heat exchanger is connected to the cooling circuit and/or integrated therein such that refrigerant circulating in the cooling circuit flows via the heat exchanger. The heat exchanger of the cooling circuit is disposed within the test space and/or in an air-treatment space of the test space, meaning air in the test space is conditioned and/or controlled in temperature via the heat exchanger. The gas cooler is also integrated in the cooling circuit and designed as a heat exchanger. The gas cooler is disposed in the cooling circuit downstream of the high-pressure compressor, the compressed refrigerant, which is highly pressurized after the compression and is present essentially in the gaseous or vaporous form and/or as wet vapor, being able to condense in the gas cooler and/or the condenser and being present essentially in a liquid aggregation state. It is also possible for the gaseous refrigerant not to condensate in the gas cooler and to exit the gas cooler essentially in the gaseous state. The gas cooler and/or the corresponding heat exchanger can be equipped with means for cooling the refrigerant, e.g., via air or water. In particular, the gas cooler can be designed as an air-conditioned finned-pipe heat exchanger. In this context, the gas cooler can be formed particularly compactly. The refrigerant flows from the gas cooler via the expansion valve, via which in turn it becomes gaseous or vaporous via expansion as a consequence of a pressure drop. For this purpose, it flows through the heat exchanger, which is consequently cooled. Subsequently, the gaseous refrigerant is suctioned and compressed again by the low-pressure compressor and the high-pressure compressor.

In the invention at hand, it is intended for the internal heat exchanger to be connected on the high-pressure side of the cooling circuit downstream of the high-pressure compressor and the gas cooler. Directly downstream of the internal heat exchanger and upstream of the expansion valve, the medium-pressure bypass is connected to the circuit by the second expansion valve. Refrigerant which has already passed the internal heat exchanger can be conducted and expanded via the second expansion valve. The internal heat exchanger is also connected in the medium-pressure bypass downstream of the second expansion valve. The refrigerant expanded at the second expansion valve flows through the internal heat exchanger, which as a result thereof is cooled. Consequently, the internal heat exchanger is cooled in the medium-pressure side and thus the refrigerant is cooled in the high-pressure side of the internal heat exchanger. Generally, however, the medium-pressure bypass can also be connected in such a manner to the cooling circuit downstream of the gas cooler and upstream of the internal heat exchanger that the refrigerant flows via the second expansion valve and the internal heat exchanger. Following the internal heat exchanger, the medium-pressure bypass is connected in such a manner between the low-pressure compressor and the high-pressure compressor that the refrigerant conducted via the medium-pressure bypass can be added to the refrigerant circulating in the cooling circuit at this position.

By using the medium-pressure bypass with the internal heat exchanger, it becomes possible to redirect refrigerant via the medium-pressure bypass, depending on the required cooling capacity of the control device, meaning less refrigerant flows via the expansion valve. Simultaneously, by means of the internal heat exchanger, the refrigerant flowing via the medium-pressure bypass can be used to control the refrigerant of the high-pressure side in temperature. The very high volumetric cooling capacity of the carbon dioxide is thus branched upstream of the heat exchanger and used for cooling the refrigerant on the high-pressure side when a lower cooling capacity is required in the test space. This allows designing a smaller test space and making the cooling circuit operated with carbon dioxide usable for more compact test chambers.

The cooling circuit can be operated in a thermodynamic subcritical or transcritical operating state. Depending on the required cooling capacity within the test space, the operating state can be changed accordingly by means of the control device. During the subcritical operation of the cooling circuit, the refrigerant is liquefied in the gas cooler below the critical point of the refrigerant and is expanded at the expansion valve and converted to the gaseous phase or to wet vapor. The high-pressure compressor and the low-pressure compressor can be operated at least in the subcritical operating state. The subcritical operating state of the cooling circuit corresponds to a partial-load operation. In the transcritical operating state, the refrigerant circulates in the cooling circuit essentially in the gaseous state. This means that a temperature difference is reduced so far that the refrigerant is not liquefied in the gas cooler. In the transcritical state, a pressure is also attained above the critical point of the refrigerant at the gas cooler. When, for example, a high required cooling capacity is present and/or a cooling from +180° C. to −20° C. is required, the cooling circuit can be operated transcritically. In the event that a low required cooling capacity is present within the test space, e.g., when a temperature is to remain constant, or low ambient temperatures are present, the cooling circuit can be operated subcritically. This allows increasing efficiency in particular for low required cooling capacities in contrast to exclusively transcritical operating states. The change between the subcritical and the transcritical operating state becomes possible in particular via the medium-pressure bypass and the internal heat exchanger.

Refrigerant can be dosed in such a manner via the second expansion valve from the high-pressure side to the medium-pressure side via the internal heat exchanger that the refrigerant becomes entirely gaseous and/or expanded in the internal heat exchanger and/or the refrigerant present in the medium-pressure side is cooled. Thus, the compressed and strongly overheated refrigerant can be cooled downstream of the low-pressure compressor. Equally, the second expansion valve can cool the medium-pressure side of the internal heat exchanger in order to additionally cool transcritical refrigerant present on the high-pressure side of the internal heat exchanger. Furthermore, the comparatively cool refrigerant flowing via the medium-pressure bypass can then be introduced between the low-pressure compressor and the high-pressure compressor. When the low-pressure compressor is in operation, it conveys refrigerant from a low-pressure side of the cooling circuit to the medium-pressure side, the refrigerant being able to have a very high temperature at this point. This can lead to a thermal overload at the high-pressure compressor. By adding the comparatively colder refrigerant via the medium-pressure bypass, this thermal overload can be avoided.

The refrigerant of the high-pressure side can be supercooled by means of the internal heat exchanger. This additional supercooling allows increasing an enthalpy difference at the heat exchanger, which in turn leads to an increase of the cooling capacity of the heat exchanger. This makes it possible to efficiently generate particularly low temperatures in the test space.

Refrigerant can be dosed in such a manner via the second expansion valve from the high-pressure side to the medium-pressure side that a mass flow of refrigerant is always larger at the high-pressure compressor than a mass flow of refrigerant at the low-pressure compressor. When the refrigerant is supercooled via the internal heat exchanger, no capacity is lost at the heat exchanger, since the conveyed mass flow via the high-pressure compressor is significantly larger than the conveyed mass flow via the low-pressure compressor. A cause is a significantly higher density of the refrigerant at an entrance of the high-pressure compressor in contrast to the density of the refrigerant at an entrance of the low-pressure compressor. The mass flows in the cooling circuit can be expressed by the following formula:

$$0=m_{high\text{-}pressure\ compressor}-(m_{low\text{-}pressure\ compressor}+m_{internal\ heat\ exchanger}).$$

Accordingly, the mass flow of the internal heat exchanger ($m_{internal\ heat\ exchanger}$) is derived from the difference of the mass flows of the high-pressure compressor ($m_{high\text{-}pressure\ compressor}$) and the low-pressure compressor ($m_{low\text{-}pressure\ compressor}$). The control device can be configured such that this relation is always maintained by a regulation of the second expansion valve. Thus, a pressure drop of the medium-pressure side can be avoided. This pressure drop of the medium-pressure side could lead to a shift of a pressure relation in the high-pressure compressor, meaning the high-pressure compressor and/or the low-pressure compressor could exceed an intended use limitation, which should be prevented.

Thus, the second expansion valve can be regulated as a function of a pressure and/or a temperature of the refrigerant present in the medium-pressure side. The pressure and/or the temperature can be measured by means of corresponding sensors. The second expansion valve can then be controlled such by means of the control device and/or a regulation apparatus of the control device that a suction temperature of the high-pressure compressor and/or a pressure at an entry side of the high-pressure compressor is present in a required range. Thus, possible damage to the high-pressure compressor and/or the low-pressure compressor as a consequence of detrimental temperatures and pressures can be avoided using simple means.

A pressure of the refrigerant can be reduced on the high-pressure side when the cooling circuit can be operated in a partial-load operating state. In a partial-load state, the cooling circuit is not operated in full load. Indeed, the expansion valve is opened with interruptions, i.e., not permanently or entirely, owing to a decreasing required cooling capacity of the control device and/or the test space. Since the refrigerant has a lower pressure on the high-pressure side, a final compressing temperature of the high-pressure compressor can be lower, whereby an emitted heat amount can be reduced via the gas cooler via an environment in which the test chamber is disposed. A thermal load of an installation space of the test chamber, which is possibly conditioned, can thus be reduced. In the partial-load operating state, only a very low cooling capacity is required, e.g., less than 2% of the cooling capacity of the cooling circuit and/or at temperatures in the test pace of, for example, ≥−10° C. Since a capacity of the compressors can hardly be regulated, the lower cooling capacity is generated at a low required cooling capacity and/or at a low temperature difference between a target temperature and an actual temperature in the test space by lowering the pressure of the refrigerant, without the compressors having to be switched off straight away. Thus, frequent switching-on intervals can be avoided for the low-pressure compressor and the high-pressure compressor, for which reason the compressors can be operated at a long service life.

A second bypass can be formed in the cooling circuit so as to have at least one third expansion valve, the second bypass being able to be connected downstream of the internal heat exchanger and upstream of the expansion valve on the high-pressure side as well as downstream of the heat exchanger and upstream of the low-pressure compressor on the low-pressure side, a suction gas temperature and/or a suction gas pressure of the refrigerant being able to be regulated in such a manner upstream of the low-pressure compressor on the low-pressure side of the cooling circuit that refrigerant can be dosed in the low-pressure side via the third expansion valve. By means of the third expansion valve, the suction gas temperature and/or the suction gas pressure can be impacted in such a manner upstream of the low-pressure compressor that a final compressing temperature of the low-pressure compressor is within an operating range intended for the low-pressure compressor. Thus, a suction gas temperature of the low-pressure compressor can rise particularly strongly when a temperature in the test space is to be reduced from +180° C., for example, to a lower temperature. Since the heat exchanger is in the test space, the refrigerant can flow from the heat exchanger to the low-pressure compressor with this temperature when the temperature is particularly high in the test space, for example, +180° C. Before the strongly overheated refrigerant is supplied to the low-pressure compressor, it can be cooled via refrigerant dosed via the third expansion valve.

Another bypass can be formed in the cooling circuit so as to have at least one other valve, the other bypass being able to be connected downstream of the high-pressure compressor and upstream of the gas cooler on the high-pressure side as well as downstream of the heat exchanger and upstream of the low-pressure compressor on the low-pressure side, a suction gas temperature and/or a suction gas pressure of the refrigerant being able to be regulated in such a manner upstream of the low-pressure compressor on the low-pressure side of the cooling circuit and/or a pressure difference between the high-pressure side and the low-pressure side of the cooling circuit being able to be compensated in such a manner that refrigerant can be dosed in the low-pressure side via the other valve. Accordingly, the other bypass is designed such that refrigerant can be conducted from the high-pressure side to the low-pressure side via the other valve. The refrigerant can be overheated and/or be gaseous. Resupplying overheated refrigerant from the high-pressure side to the low-pressure side by means of the other bypass is advantageous in particular when the cooling circuit is operated in a partial-load operating state. Since the expansion valve is opened only little or seldomly, the risk of a suction pressure dropping too low upstream of the low-pressure compressor exists. When using carbon dioxide as a refrigerant, dry ice can arise at a pressure below 5.16 bar absolute, which could disrupt a safe operation of the cooling circuit and possibly damage the low-pressure compressor. Since strongly overheated refrigerant can be conducted upstream of the low-pressure compressor via the other bypass directly downstream of the high-pressure compressor, dry ice can be effectively hindered from forming. In addition, it is also possible to compensate a pressure difference between the high-pressure side and the low-pressure side of the cooling circuit via the other bypass, e.g., when the cooling device is not in operation and the risk arises of refrigerant being heated as a result of a temperature compensation with an environment and an undesirably high pressure being set in the cooling circuit.

Refrigerant can simultaneously flow via the medium-pressure bypass, the second bypass and the other bypass when the cooling circuit is operated in a partial-load operating state. When the refrigerant is introduced to the low-pressure side via the other bypass for setting a suction gas temperature and/or a suction gas pressure on the low-pressure side, the third expansion valve can also be opened in order to keep the suction gas temperature low upstream of the low-pressure compressor in relation to the suction gas pressure, meaning a corresponding operating range of the low-pressure compressor is not exceeded.

Further, a pressure of the high-pressure side can be set comparatively low, the extent to which the expansion valve, the second expansion valve, the third expansion valve and/or the other valve can be opened differing. For instance, the greater the extent to which the second valve can be opened is, the lower a temperature in the test space is, the extent to which the other valve and the third expansion valve can be opened then being less. By opening the third expansion valve and the other valve more, a pressure would increase on the low-pressure side, whereby a temperature in the test space could no longer be maintained and/or would also increase. Consequently, the third expansion valve and the other valve can be opened further when a higher temperature is to be generated in the test space. The cooling circuit can be operated in a thermodynamic subcritical operating state, whereby an efficiency of the cooling circuit can be increased.

A revolution speed of the high-pressure compressor and/or the low-pressure compressor can be regulated. The high-pressure compressor and/or the low-pressure compressor can each be designed having a frequency converter, which allows a revolution-speed adjustment of the compressor. By lowering the revolution speed, a mass flow of the refrigerant can be further reduced in a partial-load operating state and thus an efficiency of the cooling device can be further increased in this operating state.

Advantageously, pure carbon dioxide can be used as the refrigerant. Pure carbon dioxide has a GWP of 1, is non-flammable, riskless and available at low cost. Moreover, carbon dioxide is a pure substance and azeotropic, a property which in and of itself enables carrying out the method and its variations. A refrigerant having zeotropic properties in turn would hardly enable providing a sufficient amount of gaseous refrigerant at a very slight temperature difference and consequently hardly allow a capacity regulation of the high-pressure compressor.

A temperature ranging from −40° C. to +180° C., preferably −50° C. to +180° C., particularly preferably −55° C. to +180° C., can be generated within the test space by means of the temperature control device.

The test chamber according to the invention, in particular a climate chamber for conditioning air, comprises a temperature-insulated test space, which is closable to an environment and serves for receiving test material, and a temperature control device for controlling the test space in temperature, a temperature ranging from −20° C. to +180° C. being generable within the test space by means of the temperature control device, the temperature control device having a cooling device having a cooling circuit using carbon dioxide as a refrigerant, a heat exchanger in the test space, a low-pressure compressor and a high-pressure compressor, which is disposed downstream of the low-pressure compressor in a flow direction of the refrigerant, a gas cooler and an expansion valve, the test chamber having a control device for controlling and/or regulating the temperature in the test space, the cooling circuit having an internal heat exchanger, which is connected downstream of the gas cooler and upstream of the expansion valve on a high-pressure side of the cooling circuit, the internal heat exchanger being coupled with a medium-pressure bypass of the cooling circuit, the medium-pressure bypass being connected downstream of the internal heat exchanger or the gas cooler and upstream of the expansion valve on the high-pressure side as well as upstream of the high-pressure compressor and downstream of the low-pressure compressor on a medium-pressure side of the cooling circuit, refrigerant being dosable in the medium-pressure side via the internal heat exchanger by means of a second expansion valve. Reference is made to the description of advantages of the method according to the invention regarding the advantages of the test chamber according to the invention.

The high-pressure compressor and the low-pressure compressor can be formed so as to have a shared compressor casing. Generally, the high-pressure compressor and the low-pressure compressor can also be formed so as to have two separate compressor casings. By using the low-pressure compressor and the high-pressure compressor in the shared compressor casing, a required installation space is significantly reduced for the compressor. The compressors can be configured as rotating piston compressors and as fully hermetic reciprocating compressors in the capsule format. Further, an oil separator can be installed in the cooling circuit downstream of the high-pressure compressor. Since a temperature of up to +180° C. can be attained in the test space, this temperature is transferred to the refrigerant contained therein via the heat exchanger. This can lead to a strong aging process of the oil contained in the cooling circuit, which in turn can lead to damage to the compressors. An oil mass can be kept as low as possible within the heat exchanger by means of the oil separator, meaning only little oil is exposed to accordingly high temperatures. A service life of the compressors can thus be further prolonged.

The temperature control device can have a heating apparatus having a heater and a thermal heat exchanger in the test space. The heating apparatus can, for instance, be an electric resistance heater, which heats the thermal heat exchanger in such a manner that an increase in temperature in the test space is enabled via the thermal heat exchanger. When the heat exchanger and the thermal heat exchanger can be controlled and/or regulated in a targeted manner by means of the control device in order to cool or heat the air circulated in the test space, a temperature in the ranges mentioned above can be generated within the test space by means of the temperature control device.

Further embodiments of a test chamber are derived from the descriptions of features of the device described and claimed herein.

In the following, a preferred embodiment of the invention is described in more detail with reference to the enclosed drawings.

Figure 1:
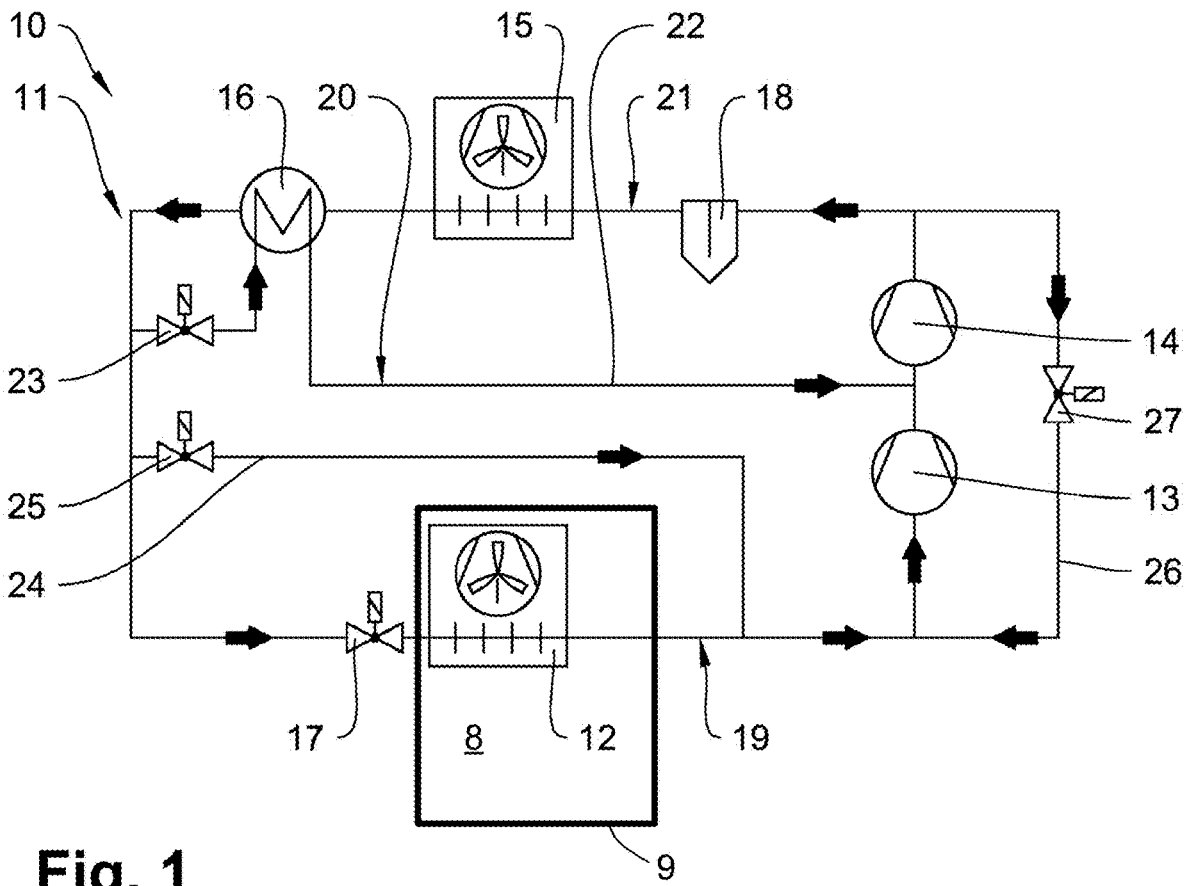
FIG. 1 shows a schematic view of a cooling device.

FIG. 1 shows a possible embodiment of a cooling device 10 of a test chamber 9. Cooling device 10 comprises a cooling circuit 11 having carbon dioxide ($CO_2$) as a refrigerant, a heat exchanger 12, a low-pressure compressor 13, a high-pressure compressor 14, a gas cooler 15, an internal heat exchanger 16 and an expansion valve 17. Moreover, an oil separator 18 is provided. Gas cooler 15 is designed in the manner of a heat exchanger and/or condenser and is cooled via a heat transfer medium, such as air or water. Heat exchanger 12 is disposed in such a manner in an air-treatment channel (not shown) of the test space 8 of the test chamber 9 that air in the test space 8, which is circulated via the air-treatment channel, can be cooled by means of heat exchanger 12. Furthermore, cooling circuit 11 has a low-pressure side 19, a medium-pressure side 20 and a high-pressure 21. In the low-pressure side 19, a pressure of the refrigerant is comparatively lower than in medium-pressure side 20. In medium-pressure side, a pressure of the refrigerant is comparatively lower than in high-pressure side 21.

Cooling circuit 11 further has a medium-pressure bypass 22 downstream of internal heat exchanger 16 and upstream of expansion valve 17 in a flow direction of the refrigerant, medium-pressure bypass 22 opening downstream of low-pressure compressor 13 and upstream of high-pressure compressor 14. A second expansion valve 23 is disposed in medium-pressure bypass 22. In this context, second expansion valve 23 is connected upstream of internal heat exchanger 16. From gas cooler 15, essentially liquid refrigerant can be conducted via high-pressure side 21 of internal heat exchanger 16 and be dosed in the medium-pressure side of internal heat exchanger 16 via second expansion valve 23 if required. In this context, the refrigerant of high-pressure side 21 is supercooled so far that an even lower temperature can be generated at expansion valve 17 and/or heat exchanger 12. Simultaneously, the refrigerant flowing via medium-pressure bypass 22 can be used to keep a suction gas temperature of high-pressure compressor 14 comparatively low.

Moreover, cooling circuit 11 has a second bypass 24 having a third expansion valve 25. Second bypass 24 is connected to cooling circuit 11 downstream of internal heat exchanger 16 and upstream of expansion valve 17 in the flow direction of the refrigerant as well as downstream of the heat exchanger 14 and upstream of low-pressure compressor 13. Liquid refrigerant can be conducted on low-pressure side 19, past expansion valve 17 and heat exchanger 12 by means of third expansion valve 25. This makes it possible to regulate a suction gas temperature and/or a suction gas pressure in low-pressure side 19 upstream of low-pressure compressor 13.

Furthermore, cooling circuit 11 comprises another bypass 26 having another valve 27, further bypass 26 being connected to cooling circuit 11 downstream of high-pressure compressor 14 and upstream of oil separator 18 and/or gas cooler 15 in the flow direction of the refrigerant as well as downstream of heat exchanger 12 and upstream of low-pressure compressor 13. By means of further bypass 26 and/or other valve 27, refrigerant, in particular overheated refrigerant and/or gaseous refrigerant, can be conducted from high-pressure side 21 to low-pressure side 19 upstream of low-pressure compressor 13 as a function of an operating state of cooling circuit 11. This also makes it possible to regulate a suction gas temperature and/or a suction gas presure of low-pressure side 19 upstream of low-pressure compressor 13. A regulation can take place by means of a control device (not shown) of the test chamber 9 and sensors, in particular pressure sensors and temperature sensors, present in cooling circuit 11.

Figure 2:
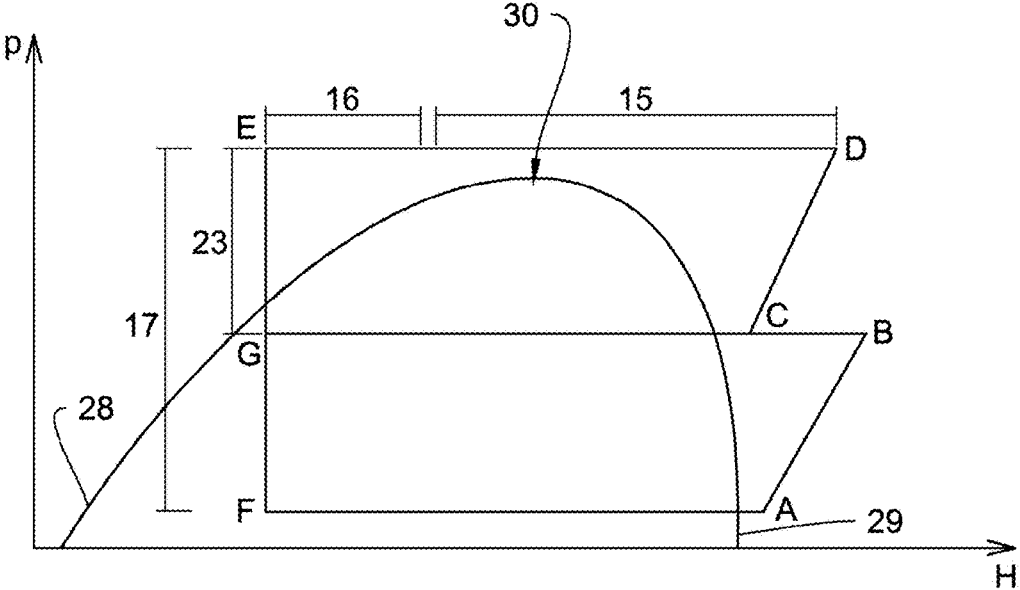
FIG. 2 shows a pressure-enthalpy diagram with an operating state of the cooling circuit.

FIG. 2 shows a pressure-enthalpy diagram (Log-p-h diagram) for the refrigerant circulating in cooling circuit 11 for an operating state of cooling circuit 11 during an operation of low-pressure compressor 13 and of high-pressure compressor 14. In the diagram, the specific enthalpy is shown on the axis of abscissas and the logarithmically scaled pressure on the axis of ordinate. A boiling curve 28 marks a transition of saturated liquid in the wet vapor, a saturated vapor line 29 marking a transition of wet vapor to saturated vapor. Boiling curve 28 and saturated vapor line 29 meet at critical point 30.

FIG. 2 shows a supercritical operating state of cooling circuit 11, in which the refrigerant is suctioned and compressed from low-pressure side 19 using low-pressure compressor 13 starting from point A so that a pressure corresponding to position B is attained downstream of low-pressure compressor 13. The refrigerant is suctioned after position C by high-pressure compressor 14 and compressed towards position D. Owing to this, the refrigerant flows via gas cooler 15 in the transcritical state and is liquefied and/or heated. After, the refrigerant passes via internal heat exchanger 16 to position E. A part of the liquid refrigerant flows via expansion valve 17, the refrigerant being expanded here (positions E to F), the refrigerant evaporating in heat exchanger 12 (positions F to A). Another part of the refrigerant flows via medium-pressure bypass 22, the refrigerant also being expanded here in second expansion valve 23 (positions E to G), the refrigerant evaporating in internal heat exchanger 16 (positions G to C). In position C, the refrigerant from medium-pressure bypass 22 mixes with the refrigerant from low-pressure compressor 13.

The invention claimed is:

1. A method for conditioning air in a temperature-insulated test space of a test chamber, in particular a climate chamber, the test space being closable to an environment and serving for receiving test material, a temperature ranging from −20° C. to +180° C. being generated within the test space by a cooling device having a cooling circuit using carbon dioxide ($CO_2$) as a refrigerant, a heat exchanger in the test space, a low-pressure compressor and a high-pressure compressor, which is disposed downstream of the low-pressure compressor in a flow direction of the refrigerant, a gas cooler and an expansion valve, the method comprising controlling and/or regulating the temperature in the test space, wherein the cooling circuit has an internal heat exchanger, which is connected on a high-pressure side of the cooling circuit downstream of the gas cooler and upstream of the expansion valve, the internal heat exchanger being coupled with a medium-pressure bypass of the cooling circuit, the medium-pressure bypass being connected downstream of the internal heat exchanger and upstream of the expansion valve on the high-pressure side as well as upstream of the high-pressure compressor and downstream of the low-pressure compressor on a medium-pressure side of the cooling circuit, refrigerant being dosed in the medium-pressure side from the high-pressure side via the internal heat exchanger by a second expansion valve;

wherein a second bypass is formed in the cooling circuit so as to have a third expansion valve, the second bypass being connected downstream of the internal heat exchanger and upstream of the expansion valve on the high-pressure side as well as downstream of the heat exchanger and upstream of the low-pressure compressor on the low-pressure side, a suction gas temperature and/or a suction gas pressure of the refrigerant being regulated in such a manner upstream of the low-pressure compressor on the low-pressure side of the cooling circuit that refrigerant is dosed as a liquid to the low-pressure side via the third expansion valve; and wherein another bypass is formed in the cooling circuit so as to have another valve, the other bypass being connected downstream of the high-pressure compressor and upstream of the gas cooler on the high-pressure side as well as downstream of the heat exchanger and upstream of the low-pressure compressor on the low-pressure side, a suction gas temperature and/or a suction gas pressure of the refrigerant being regulated in such a manner upstream of the low-pressure compressor on the low-pressure side of the cooling circuit and/or a pressure difference between the high-pressure side and the low-pressure side of the cooling circuit is compensated in such a manner that refrigerant is dosed in the low-pressure side via the other valve.

2. The method according to claim 1,
wherein
the cooling circuit is operated in a thermodynamic sub-critical or transcritical operating state.

3. The method according to claim 1,
wherein
refrigerant is dosed in such a manner via the second expansion valve from the high-pressure side to the medium-pressure side via the internal heat exchanger that the refrigerant becomes entirely gaseous in the internal heat exchanger and/or the refrigerant present in the medium-pressure side is cooled.

4. The method according to claim 1,
wherein
the refrigerant of the high-pressure side is supercooled by the internal heat exchanger.

5. The method according to claim 1,
wherein
refrigerant is dosed in such a manner via the second expansion valve from the high-pressure side to the medium-pressure side that a mass flow of refrigerant at the high-pressure compressor is larger than a mass flow of refrigerant at the low-pressure compressor.

6. The method according to claim 1,
wherein
the second expansion valve is regulated as a function of a pressure and/or a temperature of the refrigerant present in the medium-pressure side.

7. The method according to claim 1,
wherein
a pressure of the refrigerant is reduced on the high-pressure side when the cooling circuit is operated in a partial-load operating state.

8. The method according to claim 1,
wherein
refrigerant simultaneously flows via the medium-pressure bypass, the second bypass and the other bypass when the cooling circuit is operated in a partial-load operating state.

9. The method according to claim 1,
wherein
a revolution speed of the high-pressure compressor and/or the low-pressure compressor is regulated.

10. The method according to claim 1,
wherein
pure carbon dioxide ($CO_2$) is used as the refrigerant.

11. The method according to claim 1,
wherein
a temperature ranging from −40° C. to +180° C. is generated within the test space.

12. A test chamber, in particular a climate chamber for conditioning air, comprising a temperature-insulated test space, which is closable to an environment and serves for receiving test material, a temperature ranging from −20° C. to +180° C. being generable within the test space by a cooling device having a cooling circuit using carbon dioxide as a refrigerant, a heat exchanger in the test space, a low-pressure compressor and a high-pressure compressor, which is disposed downstream of the low-pressure compressor in a flow direction of the refrigerant, a gas cooler and an expansion valve,
wherein
the cooling circuit has an internal heat exchanger, which is connected on a high-pressure side of the cooling circuit downstream of the gas cooler and upstream of the expansion valve, the internal heat exchanger being coupled with a medium-pressure bypass of the cooling circuit, the medium-pressure bypass being connected downstream of the internal heat exchanger and upstream of the expansion valve on the high-pressure side as well as upstream of the high-pressure compressor and downstream of the low-pressure compressor on a medium-pressure side of the cooling circuit, refrigerant being dosable in the medium-pressure side via the internal heat exchanger by a second expansion valve;
wherein
a second bypass is formed in the cooling circuit so as to have a third expansion valve, the second bypass being connected downstream of the internal heat exchanger and upstream of the expansion valve on the high-pressure side as well as downstream of the heat exchanger and upstream of the low-pressure compressor on the low-pressure side, a suction gas temperature and/or a suction gas pressure of the refrigerant being regulated in such a manner upstream of the low-pressure compressor on the low-pressure side of the cooling circuit that refrigerant is dosed as a liquid to the low-pressure side via the third expansion valve; and,
wherein
another bypass is formed in the cooling circuit so as to have an other valve, the other bypass being connected downstream of the high-pressure compressor and upstream of the gas cooler on the high-pressure side as well as downstream of the heat exchanger and upstream of the low-pressure compressor on the low-pressure side, the suction gas temperature and/or the suction gas pressure of the refrigerant being regulated in such a manner upstream of the low-pressure compressor on the low-pressure side of the cooling circuit and/or a pressure difference between the high-pressure side and the low-pressure side of the cooling circuit is compensated in such a manner that refrigerant is dosed in the low-pressure side via the other valve.

* * * * *